May 18, 1926.
J. H. LIDHOLM
1,584,875
METHOD OF PRODUCING A FERTILIZER OF UREA
Filed Jan. 9, 1924
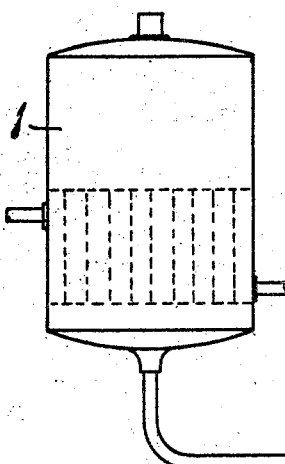
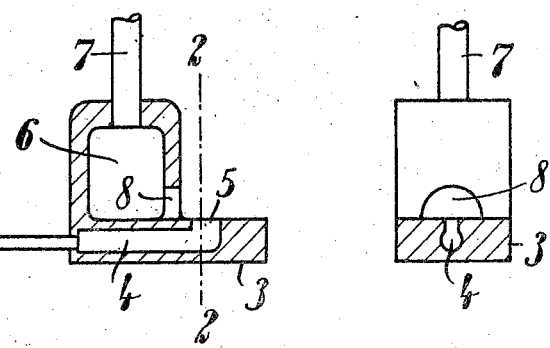
Inventor
Johan H. Lidholm,
By Henry Orth Jr.
Atty.

Patented May 18, 1926.

1,584,875

UNITED STATES PATENT OFFICE.

JOHAN HJALMAR LIDHOLM, OF WARGON, SWEDEN.

METHOD OF PRODUCING A FERTILIZER OF UREA.

Application filed January 9, 1924. Serial No. 685,267.

The invention relates to an improved fertilizer and a process for making the same.

It is well-known that urea has a high value as fertilizer inasmuch as it contains about 45% of nitrogen in such state that it can be easily assimilated by plants. It can be produced technically on a large scale from calcium cyanamide as a dilute aqueous solution from which the solid urea can be obtained by concentrating the solution and then cooling it to crystallize the urea. The urea produced in this manner is obtained as long needle-like crystals forming a felted mass which readily takes up moisture from the atmosphere so that the storing of such product is difficult and its spreading on the field by means of the usual sowing and fertilizer spreading machines is impossible.

I have now found that a urea of quite different properties especially useful as fertilizer is obtained by fusing urea containing a small content of water, and then solidifying it by cooling. Anhydrous urea has a melting point of 132 to 133° C. but the technically manufactured urea which usually contains some water melts at a temperature of 80 to 90° C. dependent on its percentage of water. The molten urea can be molded into blocks and be stored as blocks which on selling or use preferably are crushed, or the molten urea may be brought to the form of grains by suspending the molten mass as drops in a gas in which the drops are cooled so that they become solid when falling through it. In the latter case the urea is obtained as grains having a more or less regular rounded form, i. e. as spheroids and shows no tendency to cake together in storing, so that it can easily be spread on the field by means of the usual machines. Also by crushing the solid blocks of urea manufactured by casting molten urea a granular or pulverulent product is obtained which on storing remains dry and, therefore, is suitable to use as fertilizer.

According to the invention the urea solution is preferably evaporated until its content of water does not exceed 10%, which may be done without the deposition of solid urea. Upon cooling the liquid produced by such evaporation, it solidifies completely.

In the accompanying drawing I have shown diagrammatically one embodiment of an apparatus for carrying out the process of the invention. Fig. 1 shows a side view of the apparatus partly in section and Fig. 2 shows a cross-sectional view of the nozzle on the line 2—2 of Fig. 1.

Referring to the drawing, 1 is an evaporating pan of any well-known construction in which an aqueous solution of urea can be evaporated in bulk to such concentration that its content of water will be reduced to about 10 to 3%. At said percentage of water urea melts at a temperature of about 70 to 90° C. and during the evaporation the temperature in the pan is held somewhat above said value. The molten urea is drawn off through a pipe 2 having a nozzle 3 consisting of a plate which has a passage 4 ending with an upwardly directed mouth. Above the nozzle 3 a chamber for pressure air is provided the air being supplied through a pipe 7 and flowing out through an opening 8 along the upper surface of the nozzle. The pressure air which flows out with large velocity strikes the molten urea flowing out through the mouth and divides it into drops of varying size dependent on the pressure used, and the drops during their fall through the free air are cooled so that they solidify into grains having a more or less regular rounded form.

The invention is, of course, not limited to the use of the device shown in the drawing for the manufacture of the product as any well-known means for dividing a liquid into drops may be used, such as nozzles of different kinds, rotating discs, and so on. The dividing into drops of the molten urea can take place in the open air or in a closed chamber to which air or other gas is supplied as cooling medium.

What I claim is:—

1. The process of preparing urea for use as a fertilizer which comprises evaporating a solution of urea in bulk to produce a liquid containing not more than about 10 percent of water, and then cooling the liquid to solidify it, substantially without further evaporation.

2. The process of preparing urea for use as a fertilizer which comprises evaporating a solution of urea in bulk to produce a liquid containing not more than about 10 percent of water, and then suspending the liquid as drops in a gas of such temperature that the drops solidify substantially without further evaporation to produce spheroidal granules.

3. A new product comprising non-hygroscopic solid urea of dense internal structure, such as can be produced by the herein described process of cooling to solidification without substantial evaporation a liquid containing urea and not more than 10 percent of water.

4. A new product comprising non-hygroscopic solid urea in the form of spheroidal granules of dense internal structure, such as can be produced by the hereindescribed process of cooling to solidification without substantial evaporation gas-suspended drops of a liquid containing urea and not more than 10 percent of water.

In testimony whereof I have signed my name.

JOHAN HJALMAR LIDHOLM.